United States Patent
Sommer et al.

(10) Patent No.: US 8,933,146 B2
(45) Date of Patent: *Jan. 13, 2015

(54) PROCESS FOR PRODUCING HARD COATING SYSTEMS BASED ON AQUEOUS POLYURETHANE DISPERSIONS

(75) Inventors: Stefan Sommer, Leverkusen (DE); Richard Kopp, Köln (DE); Harald Blum, Hafenlohr (DE); Christoph Irle, Dormagen (DE); Jan Weikard, Odenthal-Erberich (DE); Erhard Luehmann, Bomlitz (DE)

(73) Assignee: Bayer MaterialScience AG, Leverkusen (DE)

( * ) Notice: Subject to any disclaimer, the term of this patent is extended or adjusted under 35 U.S.C. 154(b) by 1249 days.

This patent is subject to a terminal disclaimer.

(21) Appl. No.: 12/221,775

(22) Filed: Aug. 6, 2008

(65) Prior Publication Data
US 2009/0053530 A1    Feb. 26, 2009

(30) Foreign Application Priority Data
Aug. 11, 2007 (DE) .......................... 10 2007 038 085

(51) Int. Cl.
| | | |
|---|---|---|
| *C08F 253/00* | (2006.01) | |
| *C08G 18/62* | (2006.01) | |
| *C08G 18/04* | (2006.01) | |
| *C08G 18/06* | (2006.01) | |
| *C08G 18/40* | (2006.01) | |
| *C08G 18/12* | (2006.01) | |
| *C08G 18/08* | (2006.01) | |
| *C08G 18/67* | (2006.01) | |
| *C09D 175/16* | (2006.01) | |

(52) U.S. Cl.
CPC ............ *C08G 18/12* (2013.01); *C08G 18/0823* (2013.01); *C08G 18/672* (2013.01); *C08G 18/675* (2013.01); *C08G 18/6795* (2013.01); *C09D 175/16* (2013.01)
USPC ................ 522/174; 522/84; 522/85; 522/86; 522/90; 522/96; 522/92; 522/97; 522/93; 522/95; 522/113; 522/114; 522/120; 522/151; 522/152; 522/153; 525/123; 525/126; 525/125; 525/128; 525/453; 525/131; 525/454; 525/455; 525/452; 525/458; 525/459; 525/460; 525/461; 525/463

(58) Field of Classification Search
USPC ............ 522/84, 85, 96, 173, 174, 92, 97, 93, 522/113, 120, 114, 151, 152, 153; 525/453, 525/454, 455, 452, 457, 458, 459, 460, 461, 525/463, 123, 125, 126, 128, 131
See application file for complete search history.

(56) References Cited

U.S. PATENT DOCUMENTS

| | | | |
|---|---|---|---|
| 4,108,814 A | 8/1978 | Reiff et al. | |
| 5,684,081 A | 11/1997 | Dannhorn et al. | |
| 6,207,744 B1 | 3/2001 | Paulus et al. | |
| 6,521,702 B1 | 2/2003 | Weikard et al. | |
| 2003/0162892 A1 | 8/2003 | Maier et al. | |
| 2004/0259970 A1* | 12/2004 | Lockhart et al. | 522/84 |
| 2005/0003102 A1* | 1/2005 | Lockhart et al. | 427/558 |
| 2007/0149704 A1* | 6/2007 | Naderhoff et al. | 524/591 |
| 2008/0139691 A1* | 6/2008 | Blum et al. | 522/90 |
| 2008/0145563 A1* | 6/2008 | Heischkel et al. | 427/487 |
| 2008/0280139 A1* | 11/2008 | Wagner et al. | 428/402 |
| 2009/0012201 A1* | 1/2009 | Kim et al. | 522/84 |
| 2009/0162564 A1* | 6/2009 | Naderhoff et al. | 427/508 |
| 2009/0269589 A1* | 10/2009 | Sommer et al. | 428/425.1 |
| 2010/0210757 A1* | 8/2010 | Sommer et al. | 523/402 |

FOREIGN PATENT DOCUMENTS

| | | |
|---|---|---|
| CA | 2253119 A1 | 5/1999 |
| DE | 3316592 A1 | 11/1984 |
| DE | 4040290 C2 | 5/1996 |
| EP | 0181486 B1 | 11/1988 |
| EP | 0872502 B1 | 6/2003 |
| WO | 2006138557 A2 | 12/2006 |

OTHER PUBLICATIONS

Polyurethane-waterborne PUR dispersion acetone process from Bayer Chemical. [online]. Retrieve from internet on Aug. 10, 2010. Retrived from internet URL:<http://www.bayercoatings.de/bms/db-rsc/bms_rsc_cas.nsf/id/COEN_The_acetone_process>.*
P.K.T. Oldring (Ed.) Chemistry & Technology of UV & EB Formulation for Coatings, Inks & Paints, vol. 2, (month unavailable) 1991, "Polyester Acrylates", p. 123-135.
P.K.T. Oldring (Ed.) Chemistry & Technology of UV & EB Formulation for Coatings, Inks & Paints, vol. 2, (month unavailable) 1991, "Epoxy Acrylates", p. 37-56.
Dieter Maassen et al, Ullmanns Encyclopadie der technischen Chemie, 4th edition, vol. 19, (date unavailable), "Polyalkylenglykole", p. 31-38.
D. Dieterich, Methoden der Organischen Chemie, Houben-Weyl, 4th edition, vol. E20/part 2 (month unavailable) 1987, "Poly(urethane)" p. 1682.

* cited by examiner

*Primary Examiner* — Sanza McClendon
(74) *Attorney, Agent, or Firm* — Donald R. Palladino; Robert S. Klemz

(57) ABSTRACT

The present invention describes the preparation of an aqueous polyurethane dispersion which is cured by radiation, and its use as binder.

20 Claims, No Drawings

PROCESS FOR PRODUCING HARD COATING SYSTEMS BASED ON AQUEOUS POLYURETHANE DISPERSIONS

CROSS-REFERENCE TO RELATED APPLICATIONS

The present application claims the right of priority under 35 U.S.C. §119 (a)-(d) of German Patent Application Number 10 2007 038 085.4, filed Aug. 11, 2007.

BACKGROUND OF THE INVENTION

The present invention describes a process for producing hard, radiation-curable coating systems based on aqueous polyurethane dispersions, the coating systems obtainable by the process, the use of the coating systems as coating materials and/or adhesives, and articles and substrates which comprise these coating materials and/or adhesives.

Radiation-curable, aqueous coating systems based on a polyurethane polymer find application in the coating of substrates including wood, plastics and leather, and are distinguished by a multiplicity of positive qualities, such as high chemical resistance and mechanical stability. A particular advantage is the ultra-rapid curing, within seconds, of the polyurethane topcoat by crosslinking of the ethylenic double bonds present in the polymer, by means of high-energy radiation.

If aqueous, radiation-curable polyurethane dispersions are used in coating systems for pigmented coating materials, the photochemical curing is hindered as a result of the absorption and scattering of the pigment. As a result, the coating only partially cures, and the high quality properties of a transparent polyurethane coating material are not achieved.

EP-B 753 531 and EP-B 942 022 describe polyester acrylate urethane dispersions based on hydroxyl-containing polyester acrylates, polyether acrylates and polyepoxy acrylates. Oligomethacrylates, of the kind set out in this specification as component (E), are not used in EP-B 753 531 and EP-B 942 022. The coating systems described are suitable for physically drying transparent coating materials, more particularly for wood and plastic applications. Where binder systems of this kind are pigmented, inadequate reactivity results in low hardness and inadequate resistance towards chemicals and coloring liquids.

Aqueous, radiation-curable polyurethane dispersions based on hydroxyl-containing polyester acrylates and polyether acrylates are found in EP-B 872 502. There again, the preferred application of the coating systems is in transparent coating materials. Oligomethacrylates of the kind set out in this specification as component (E) are not used in EP-B 872 502. The pigmented coating materials of Example 10 evidence sensitivity to coffee, mustard and red wine at a pigment content of just 10% by weight. The sensitivity to marks is said to be improvable through application of an additional transparent coating material. The hardness of the pigmented system is not addressed. In contrast to all of the other examples, elasticity and hardness are not addressed.

EP-B 1 311 639 describes the production and use of a coating system for veneer that is based on polyurethane dispersions. Besides a polyurethane acrylate, the dispersions comprise a solvent component, preferably N-methylpyrrolidone. A description is given of their application in the postforming process, where an important factor is high flexibility on the part of the veneers. Even as a transparent coating material, the coverings obtained are very soft. Pigmented systems based on the cited binders are significantly less suitable. Furthermore, on account of its teratogenic effect, the use of N-methylpyrrolidone is undesirable. Any indication that, without the use of such a solvent component, aqueous polyurethane dispersions are obtained that are suitable for the use of hard coating systems is absent from EP-B 1 311 639.

EP-B 181 486 describes polyurethane dispersions which are based on polyether-, polyester-, polylactone- and carbonate diols and/or mixtures thereof but carry no acrylate functions on the polyurethane backbone. By admixing acrylate-containing compounds, an aqueous, UV-curable polyurethane dispersion is obtained for the high-gloss coating of leather. Since it is not possible for photo-induced crosslinking to take place between the acrylate-containing compounds and the polyurethane, the resulting applied films are very soft and flexible and of low chemical resistance. Any disclosure to the effect that aqueous polyurethane dispersions which carry acrylate functions on the polyurethane backbone can be used for producing hard coating systems is absent from EP-B 181 486.

For everyday products that are confronted by severe challenges, such as mobile phone casings, for which minimal scratchability, maximum chemical resistance, adhesion and appealing optical qualities are required, the coating-systems employed are still always solvent-borne coating systems, since aqueous binders, such as in the systems cited here, do not yet achieve sufficiently good outcomes in the entirety of their properties, such as high gloss and sun cream resistance. Here as well a switch to aqueous systems is called for on environmental grounds.

The object of the present invention is therefore to provide a process that makes it possible to provide coating systems which are based on an aqueous, radiation-curable dispersion, are pigmentable and are distinguished by mechanical stability, chemical resistance and high gloss.

SUMMARY OF THE INVENTION

This object is achieved by processes for producing hard, radiation-curable coating systems, based on aqueous polyurethane dispersions, comprising the following steps:

I) reacting by polyaddition:
  A) 40% to 80% by weight of a hydroxyl-containing component containing
    A1) 10% to 80% by weight, based on the sum of components (A) to (F), of one or more hydroxyl-containing prepolymers selected from the group of polyesters, polyethers, polyepoxy (meth)acrylates and polyurethanes having an OH number in the range from 40 to 300 mg KOH/g and containing groups which, under exposure to high-energy radiation, undergo polymerization reaction with ethylenically unsaturated double bonds,
    and optionally
    A2) 0% to 50% by weight, based on the sum of components (A) to (F), of one or more alcohols containing (meth)acrylate groups and having an OH number in the range from 35 to 1000 mg KOH/g,
  B) 0.1% to 20% by weight of one or more compounds that are reactive towards isocyanate groups and act dispersively for the polyurethane dispersion,
  C) 0% to 30% by weight of hydroxy-functional compounds selected from the group consisting of diols, triols, polyesters, polycarbonates, polyurethanes, $C_2$, $C_3$, and/or $C_4$ polyethers, polyether esters and polycarbonate polyesters, the diols and triols having a molecular weight in the range from 62 to 242 g/mol, and the polyesters, polycarbonates, polyurethanes, $C_2$, $C_3$, and/or $C_4$ polyethers, polyether esters and polycarbonate polyesters having in each case a molecular weight in the range from 700 to 4000 g/mole, with D) 10% to 50% by weight of one or more polyisocyanates to form a polyurethane and thereafter II) adding E) 2% to 40% by weight of oligo(meth)acrylates selected from the group of component (A1) having a double bond density of greater than 2.0 mol of double bonds/kg of substance and through exposure to high-energy radiation undergoing polymerization reaction with ethylenically unsaturated compounds, and/or oligo(meth)acrylates based on (meth)acrylate esters, obtainable by esterification of (meth)acrylic acid with alcohols selected from the group of tetrols and hexols, III) subsequently dispersing the product obtained according to step II) in water to form an aqueous polyurethane dispersion, and IV) reacting the aqueous polyurethane dispersion obtained from step III) with F) 0.1% to 10% by weight of one or more mono-, di-, or polyamines and/or amino alcohols, the fractions of components (A) up to (F) adding up to 100% by weight and the coating systems, after curing, having a König pendulum hardness to DIN 53157 of greater than 60 sec for an applied film with a wet thickness of 150 μm and a breaking extension to EN ISO 527 of less than 150% for an applied film with a wet thickness of 250 μm.

DETAILED DESCRIPTION OF THE PREFERRED EMBODIMENTS

The process of the invention is advantageous when components (A), (B) and (C) are introduced as an initial charge to the reactor, optionally in dilution with a solvent which is miscible with water but inert towards isocyanate groups, and this initial charge is heated to temperatures of 30 to 80° C. Isocyanate addition reaction catalysts are optionally added to the mixture of the compounds (A), (B) and (C) before the reaction takes place with the polyisocyanate or polyisocyanates (D), the molar ratios of isocyanate-reactive groups in (A), (B) and (C) to isocyanate groups in (D) being situated in the range from 0.8:1 to 2.5:1. The polyurethane obtainable according to step I) is dissolved with the oligo(meth)acrylates (E) in acetone, to form an oligo(meth)acrylate-acetone solution, and, with vigorous stirring according to step III and IV), either this solution is introduced into the dispersing water comprising the polyamine or polyamines (F) or, conversely, the dispersing water/polyamine mixture is added to the polyurethane-oligo(meth)acrylate-acetone solution. Optionally, the acetone is subsequently removed by distillation.

The invention further provides hard, radiation-curable coating systems obtainable by the process of the invention.

The coating system obtainable by the process of the invention is advantageous when the degree of neutralization of the acids and/or bases introduced by component (B) is between 50% and 125%.

The coating system obtainable by the process of the invention is advantageous when the reaction IV) of the remaining free isocyanate groups of the prepolymer by component (F) takes place to an extent of 35% to 150%.

The coating system obtainable by the process of the invention is advantageous when 2% to 40% by weight of oligo (meth)acrylates (E) based on (meth)acrylate esters obtainable from the esterification of (meth)acrylic acid with alcohols selected from the group of tetrols and hexyls are present.

The coating system obtainable by the process of the invention is advantageous when 2% to 40% by weight of oligo (meth)acrylates (E) based on polyester (meth)acrylates having an OH number in the range from 30 to 300 mg KOH/g are present.

The coating system obtainable by the process of the invention is advantageous when 2% to 40% by weight of oligo (meth)acrylates (E) based on polyether (meth)acrylates having an OH number in the range from 5 to 200 mg KOH/g are present.

The coating system obtainable by the process of the invention is advantageous when 2% to 40% by weight of oligo (meth)acrylates (E) based on polyepoxy (meth)acrylates having an OH number in the range from 20 to 300 mg KOH/g are present.

The coating system obtainable by the process of the invention is advantageous when 2% to 40% by weight of oligo (meth)acrylates (E) based on polyurethane (meth)acrylates having an OH number in the range from 20 to 300 mg KOH/g are present.

The coating system obtainable by the process of the invention is advantageous when 2% to 40% by weight of mixtures of the oligo(meth)acrylates (E) selected from the group of polyester, polyether, polyurethane, polyepoxy (meth)acrylates and (meth)acrylate esters obtainable by esterification of (meth)acrylic acid with alcohols selected from the group of tetrols and hexyls are present.

The coating system obtainable by the process of the invention is advantageous when step IV) is carried out in acetonic solution before or after the addition of component (E).

The coating system obtainable by the process of the invention is advantageous when the aqueous polyurethane dispersion obtainable according to step III) comprises at least a further initiator and optionally further auxiliaries and additives which allow curing with high-energy radiation.

The coating system obtainable by the process of the invention is advantageous when the aqueous polyurethane dispersion obtainable according to step III) contains less than 5% by weight of organic solvents.

The invention further provides for the use of the coating system obtainable by the process of the invention for producing adhesives and/or hard transparent or pigmented coating materials.

The invention further provides for the use of the coating system obtainable by the process of the invention for producing adhesives and/or hard transparent or pigmented coating materials which exhibit high resistance to solvents and colouring substances.

The use of the coating system obtainable by the process of the invention is advantageous when the adhesives and/or hard transparent or pigmented coating materials have a König pendulum hardness of DIN 53157 of greater than 60 sec for an applied film with a wet thickness of 150 μm and a breaking extension to EN ISO 527 of less than 150% for an applied film with a wet thickness of 250 μm.

The invention further provides hard transparent or pigmented coating materials which comprise a coating system obtainable by the process of the invention.

The invention further provides an adhesive which comprises a coating system obtainable by the process of the invention.

The invention further provides for the use of the hard transparent or pigmented coating material which comprises a coating system obtainable by the process of the invention for producing a coated substrate.

The invention further provides for the use of the adhesive which comprises a coating system obtainable by the process of the invention for producing an article constructed from at least two or more materials.

The invention further provides a substrate comprising a hard transparent or pigmented coating material which comprises a coating system obtainable by the process of the invention.

The substrate comprising a hard transparent or pigmented coating material which comprises a coating system obtainable by the process of the invention is advantageous when the substrate is selected from the group of wood, wood-based materials, furniture, wood-block flooring, doors, window frames, metallic articles, plastics, paper, cardboard, cork or leather.

The invention further provides an article comprising the adhesive which comprises a coating system obtainable by the process of the invention.

The article comprising the adhesive which comprises a coating system obtainable by the process of the invention is advantageous when the article is constructed from at least two alike and/or different materials selected from the group of wood, wood-based materials, furniture, wood-block flooring, doors, window frames, metallic articles, plastics, paper, cardboard, cork or leather.

Component (A) comprises a component (A1) and optionally a component (A2). Component (A1) comprises polymers and oligomers containing unsaturated groups. These polymers and oligomers containing unsaturated groups are preferably selected from the group of polyester (meth)acrylates, polyether (meth)acrylates, polyepoxy (meth)acrylates, polyether ester (meth)acrylates, polyurethane (meth)acrylates, unsaturated polyesters with allyl ether structural units, and combinations of the stated compounds.

Of the polyesther (meth)acrylates, use is made as component (A1) of the hydroxyl-containing polyester (meth)acrylates having an OH number in the range from 30 to 300 mg KOH/g, preferably from 60 to 200, more preferably from 70 to 120 mg KOH/g. For the preparation of the hydroxy-functional polyester (meth)acrylates (A1) it is possible to employ a total of 7 groups of monomer constituents:

The first group (a) comprises alkanediols or diols or mixtures of these. The alkanediols have a molecular weight in the range from 62 to 286 g/mol. Preference is given to the alkanediols selected from the group of ethanediol, 1,2- and 1,3-propanediol, 1,2-, 1,3- and 1,4-butanediol, 1,5-pentanediol, 1,6-hexanediol, neopentylglycol, cyclohexane-1,4-dimethanol, 1,2- and 1,4-cyclohexanediol, 2-ethyl-2-butylpropanediol. Preferred diols are diols containing ether oxygen, such as diethylene glycol, triethylene glycol, tetraethylene glycol, dipropylene glycol, tripropylene glycol, polyethylene, polypropylene or polybutylene glycols having a molecular weight in the range from 200 to 4000, preferably 300 to 2000, more preferably 450 to 1200 g/mol. Reaction products of the aforementioned diols with ε-caprolactone or other lactones may likewise be employed as diols.

The second group (b) comprises alcohols having a functionality of three or more and a molecular weight in the range from 92 to 254 g/mol and/or polyethers prepared starting from these alcohols. Particularly preferred alcohols having a functionality of three or more are glycerol, trimethylolpropane, pentaerythritol, dipentaerythritol and sorbitol. One particularly preferred polyether is the reaction product of 1 mol of trimethylolpropane with 4 mol of ethylene oxide.

The third group (c) comprises monoalcohols. Particularly preferred monoalcohols are selected from the group of ethanol, 1- and 2-propanol, 1- and 2-butanol, 1-hexanol, 2-ethylhexanol, cyclohexanol and benzyl alcohol.

The fourth group (d) comprises dicarboxylic acids having a molecular weight in the range from 104 to 600 g/mol and/or their anhydrides. Preferred dicarboxylic acids and their anhydrides are selected from the group of phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, subaric acid, sebacic acid, dodecanedioic acid, hydrogenated dimers of fatty acids of the kind listed under the sixth group (f).

The fifth group (e) comprises trimellitic acid or trimellitic anhydride.

The sixth group (f) comprises monocarboxylic acids selected from the group of benzoic acid, cyclohexanecarboxylic acid, 2-ethylhexanoic acid, caproic acid, caprylic acid, capric acid, lauric acid, and natural and synthetic fatty acids selected from the group of lauric, myristic, palmitic, margaric, stearic, behenic, cerotic, palmitoleic, oleic, icosenoic, linoleic, linolenic and arachidonic acid.

The seventh group (g) comprises acrylic acid, methacrylic acid and/or dimeric acrylic acid.

Suitable hydroxyl-containing polyester (meth)acrylates (A1) comprise the reaction product of at least one constituent from group (a) or (b) with at least one constituent from group (d) or (e) and at least one constituent from group (g).

Particularly preferred constituents from group (a) are selected from the group of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, selected from the group of diethylene glycol, triethylene glycol, tetraethylene glycol, dipropylene glycol, and tripropylene glycol. Preferred constituents from group (b) are selected from the group of glycerol, trimethylolpropane, pentaerythritol or the reaction product of 1 mol of trimethylolpropane with 4 mol of ethylene oxide. Particularly preferred constituents from groups (d) and (e) are selected from the group of phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecanedioic acid, hydrogenated dimers of the fatty acids of the kind listed under the 6th group (f), and trimellitic anhydride. A preferred constituent from group (g) is acrylic acid.

Optionally it is also possible to incorporate into these polyester (meth)acrylates groups which have a dispersing action and are known in the art. As an alcohol component, then, it is possible to make proportional use of polyethylene glycols and/or methoxypolyethylene glycols. As compounds it is possible to use polypropylene glycols and polyethylene glycols prepared starting from alcohols, and the block copolymers of the said glycols, and also the monomethyl ethers of these polyglycols. Particularly suitable is polyethylene glycol monomethyl ether having a molecular weight in the range of 500-1500 g/mol.

A further possibility, after the esterification, is to react some of the remaining free, unesterified carboxyl groups, more particularly those of the (meth)acrylic acid, with mono-, di- or polyepoxides. Preferred epoxides are the glycidyl ethers of monomeric, oligomeric or polymeric bisphenol A, bisphenol F, hexanediol and/or butanediol or the ethoxylated and/or propoxylated derivatives thereof, of the kind also used for the synthesis of epoxy (meth)acrylates (see below). This reaction may be used more particularly for the purpose of increasing the OH number of the polyester (meth)acrylate, since the epoxide-acid reaction produces in each case one OH group. The acid number of the resulting product is between 0 and 20 mg KOH/g, preferably between 0 and 10 mg KOH/g and more preferably between 0 and 5 mg KOH/g. The reaction is preferably catalyzed by catalysts such as triphenylphosphine, thiodiglycol, ammonium halides and/or phosphonium halides and/or zirconium compounds or tin compounds such as tin(II) ethylhexanoate.

The preparation of polyester (meth)acrylates is described on page 3, line 25 to page 6, line 24 of DE-A 4 040 290, on page 5, line 14 to page 11, line 30 of DE-A 3 316 592 and pages 123 to 135 of P. K. T. Oldring (Ed.) in Chemistry & Technology of UV & EB Formulations For Coatings, Inks & Paints, Vol. 2, 1991, SITA Technology, London.

Likewise preferred as component (A1) are the conventional hydroxyl-containing epoxy (meth)acrylates having an OH number in the range from 20 to 300 mg KOH/g, preferably from 100 to 280 mg KOH/g, more preferably from 150 to 250 mg KOH/g or hydroxyl-containing polyurethane (meth)acrylates having an OH number in the range from 20 to 300 mg KOH/g, preferably from 40 to 150 mg KOH/g, more preferably from 50 to 100 mg KOH/g, and also their mixtures with one another and mixtures with hydroxyl-containing unsaturated polyesters or mixtures with polyester (meth)acrylates, or mixtures of hydroxyl-containing unsaturated polyesters with polyester (meth)acrylates. Compounds of this kind are likewise described on pages 37 to 56 in P. K. T. Oldring (Ed.), Chemistry & Technology of UV & EB Formulations For Coatings, Inks & Paints, Vol. 2, 1991, SITA Technology, London. Hydroxyl-containing epoxy (meth)acrylates are based more particularly on reaction products of acrylic acid and/or methacrylic acid with epoxides (glycidyl compounds) of monomeric, oligomeric or polymeric bisphenol A, bisphenol F, hexanediol and/or butanediol or the ethoxylated and/or propoxylated derivates thereof.

Likewise suitable as component (A1) are hydroxyl-containing polyether (meth)acrylates which originate from the reaction of acrylic acid and/or methacrylic acid with polyethers. The polyethers are selected from the group or homopolymers, copolymers or blockcopolymers of ethylene oxide, propylene oxide and/or tetrahydrofuran based on any desired hydroxy-functional and/or amine-functional starter molecules selected from the group of trimethylolpropane, diethylene glycol, dipropylene glycol, glycerol, pentaerythritol, neopentyl glycol, butanediol and hexanediol.

Besides the unsaturated compounds, component (A1) preferably also contains NCO-reactive compounds, more particularly hydroxyl groups. Via these hydroxyl groups there is partial or complete incorporation into the polyurethane backbone.

Preferred components (A1) are compounds selected from the group of the polyester (meth)acrylates, polyether (meth)acrylates, polyepoxy (meth)acrylates, urethane (meth)acrylates and polyether ester (meth)acrylates which besides the unsaturated groups also contain hydroxyl groups.

Particularly preferred as component (A1) are hydroxy-functional polyester (meth)acrylates, polyether (meth)acrylates and polyepoxy (meth)acrylates.

Additionally it is possible to use compounds of component (A1) alone or in combination with the below-stated compounds (A2).

Component (A2) comprises one or more alcohols which contain (meth)acrylate groups and have an OH number in the range of 35-1000 mg KOH/g, preferably having an OH number in the range from 130 to 966 mg KOH/g. Alcohols of this kind containing (meth)acrylate groups are selected from the group of 2-hydroxyethyl (meth)acrylate, polyethylene oxide mono(meth)acrylates, polypropylene oxide mono(meth)acrylates, polyalkylene oxide mono(meth)acrylates, polycaprolactone mono(meth)acrylates such as Pemcure® 12A (Cognis, DE), 2-hydroxypropyl (meth)acrylate, 4-hydroxybutyl (meth)acrylate, 3-hydroxy-2,2-dimethylpropyl (meth)acrylate, the mono-, di-, tri-, tetra- or penta(meth)acrylates of polyhydric alcohols such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or their technical mixtures, the incorporation of (A2) into the adduct of components (A) to (D) taking place via remaining free hydroxy functions.

It is also possible, moreover, to make use as component (A2) of alcohols which are obtainable from the reaction of double-bond-containing acids with optionally double-bond-containing, monomeric epoxide compounds. Preferred reaction products are selected from the group of (meth)acrylic acid with glycidol (meth)acrylate or with the glycidyl ester of tertiary, saturated monocarboxylic acid. The tertiary, saturated monocarboxylic acids come from the group of 2,2-dimethylbutyric acid, ethylmethylbutyric acid, ethylmethylpentanoic acid, ethylmethylhexanoic acid, ethylmethylheptanoic acid and ethylmethyloctanoic acid.

Of very particular preference as component A2 are 2-hydroxyethyl (meth)acrylate, 2-hydroxypropyl (meth)acrylate, pentaerythritol triacrylate, dipentaerythritol pentaacrylate and the adduct of glycidyl ethylmethylheptanoate with (meth)acrylic acid, and technical mixtures thereof.

Component (B) comprises one or more compounds which are reactive towards isocyanate groups and which act dispersively for the aqueous polyurethane dispersion. By compounds which are reactive towards isocyanate groups and which act dispersively are meant acids, bases, ionic compounds and compounds containing ether groups. Preferred acids and bases contain groups selected from the group of hydroxyl, amino and thiol groups, via which incorporation into the reaction product of components (A), (C) and (D) takes place and whose isocyanate-reactive groups are subsequently converted into the corresponding dispersive groups selected from the group of sulphonium, ammonium, carboxylate and sulphonate salts. Particularly preferred acids, bases and ionic compounds are selected from the group of mono- and dihydroxycarboxylic acids, mono- and aiaminocarboxylic acids, mono- and dihydroxysulphonic acids, mono- and diaminosulphonic acids, mono- and dihydroxyphosphonic acids, mono- and diaminophosphonic acids and their salts such as dimethylolpropionic acid, dimethylolbutyric acid, hydroxypivalic acid, N-(2-aminoethyl)alanine, 2-(2-aminoethylamino)ethanesulphonic acid, ethylenediamine-propyl- or butylsulphonic acid, 1,2- or 1,3-propylenediamine-ethylsulphonic acid, malic acid, citric acid, glycolic acid, lactic acid, glycine, alanine, taurine, lysine, 3,5-diaminobenzoic acid, an adduct of isophoronediamine (1-amino-3,3,5-trimethyl-5-aminomethylcyclohexane or IPDA) and acrylic acid (EP-A 916 647, example 1) and its alkali metal salts or ammonium salts, the adduct of sodium bisulphite with but-2-ene-1, 4-diol, polyethersulphonate, the propoxylated adduct of 2-butenediol and $NaHSO_3$ as described in DE-A 2 446 440 on page 5-9, formula I-III, and also N-methyldiethanolamine, compounds containing carboxyl groups or carboxylate groups and/or sulphonate groups and/or ammonium groups. Particularly preferred ionic compounds are those which contain carboxyl and/or sulphonate groups as ionic groups, such as the salts of 2-(2-aminoethyl-amino)ethanesulphonic acid or of the adduct of isophoronediamine and acrylic acid (EP 916 647 A1, Example 1) and also of dimethylolpropionic acid.

Preferred compounds containing ether groups are selected from the group of polypropylene glycols and polyethylene glycols prepared starting from alcohols, their block copolymers, and the monomethyl ethers of these polyglycols. Preference is given to polyethers of linear construction with a functionality between 1 and 3, but also compounds of the general formula (I),

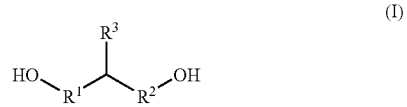

in which $R^1$ and $R^2$ independently of one another are each a divalent aliphatic, cycloaliphatic or aromatic radical having 1 to 18 C atoms, which may be interrupted by oxygen and/or nitrogen atoms, and $R^3$ is an alkoxy-terminated polyethylene oxide radical.

Preferred polyethers are selected from the group of monofunctional polyalkylene oxide polyether alcohols having on average per molecule 5 to 70, preferably 7 to 55 ethylene oxide units, such alcohols being of the kind obtainable in conventional manner by alkoxylation of suitable starter molecules, and as described in Ullmanns Encyclopädie der technischen Chemie, 4th edition, volume 19, Verlag Chemie, Weinheim pages 31-38.

Starter molecules preferred for this purpose are selected from the group of saturated monoalcohols such as methanol, ethanol, n-propanol, isopropanol, n-butanol, isobutanol, sec-butanol, the isomers of pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as diethylene glycol monomethyl ether, diethylene glycol monoethyl ether, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic, secondary amines such as morpholine, pyrrolidine, piperidine and 1H-pyrazole. Particularly preferred starter molecules are selected from the group of saturated monoalcohols and the monomethyl, monoethyl and monobutyl ethers of diethylene glycol. Preference is given more particularly to diethylene glycol monomethyl, monoethyl or monobutyl ethers. Alkylene oxides suitable for the alkoxylation reaction are ethylene oxide and propylene oxide, which can be used in either order or else in a mixture in the alkoxylation reaction.

The polyalkylene oxide polyether alcohols are either pure polyethylene oxide polyethers or mixed polyalkylene oxide polyethers, at least 30 mol %, preferably at least 40 mol %, of whose alkylene oxide units are composed of ethylene oxide units. Preferred nonionic compounds are monofunctional mixed polyalkylene oxide polyethers which contain at least 40 mol % ethylene oxide units and not more than 60 mol % propylene oxide units.

The stated acids are converted into the corresponding salts by reaction with neutralizing agents, such as triethylamine, ethyldiisopropylamine, dimethylcyclohexylamine, dimethylethanolamine, ammonia, N-ethylmorpholine, LiOH, NaOH and/or KOH. The degree of neutralization in this case is between 50% and 125%.

Component (C) comprises hydroxy-functional compounds selected from the group of diols and triols having in each case a molecular weight in the range from 62 to 242 g/mol, hydroxy-functional polyesters, polycarbonates, polyurethanes, $C_2$, $C_3$, and/or $C_4$ polyethers, polyether esters, polycarbonate polyesters, having in each case a molecular weight in the range from 700 to 4000 g/mol.

Preferred diols and triols of component C are selected from the group of aliphatic, araliphatic or cycloaliphatic diols or triols containing 2 to 20 carbon atoms. Preferred diols are selected from the group of ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Particular preference is given to 1,4-butanediol, 1,4-cyclohexanedimethanol and 1,6-hexanediol.

Preferred oligomers and/or polyols of higher molecular mass, such as diols or polyols or amino alcohols having a number-average molecular weight in the range from 500 to 4 000 g/mol, such as hydroxy-functional oligomers or polymers such as hydroxy-functional polyesters, polycarbonates, polyurethanes, $C_2$, $C_3$, and/or $C_4$ polyethers, polyether esters or polycarbonate polyesters have an average hydroxyl functionality of 1.5 to 3.5, preferably of 1.8 to 2.5.

Preferred hydroxy-functional polyester alcohols are those based on aliphatic, cycloaliphatic and/or aromatic di-, tri- and/or polycarboxylic acids with di-, tri- and/or polyols and also polyester alcohols based on lactones. Particularly preferred polyester alcohols are selected from the group of the reaction products of adipic acid, isophthalic acid and phthalic anhydride with hexanediol, butanediol, diethylene glycol, monoethylene glycol or neopentyl glycol or mixtures of the stated diols of molecular weight from 500 to 4000, preferably 800 to 2500.

Preferred hydroxy-functional polyetherols are selected from the group of reaction products obtainable by polymerization of cyclic ethers or by reaction of alkylene oxides with a starter molecule. Particularly preferred are polyethylene and/or polypropylene glycols with an average molecular weight of 500 to 13 000 g/mol and also polytetrahydrofurans having an average molecular weight in the range from 500 to 4000 g/mol, preferably from 800 to 3000 g/mol.

Preferred hydroxy-functional polycarbonates are hydroxyl-terminated polycarbonates which through reaction of diols or else lactone-modified diols or else bisphenols selected from the group of bisphenol A, polycarbonates accessible with phosgene or carbonic diesters such as diphenyl carbonate or dimethyl carbonate, polymeric carbonates of 1,6-hexanediol having an average molecular weight of in the range from 500 to 4000 g/mol and carbonates as reaction products of 1,6-hexanediols with ε-caprolactone in a molar ratio in the range from 1 to 0.1. Particularly preferred are the aforementioned polycarbonate diols having an average molecular weight in the range from 800 to 3000 g/mol based on 1,6-hexanediol and/or carbonates of reaction products of 1,6-hexanediol with ε-caprolactone in a molar ratio in the range from 1 to 0.33.

Preferred hydroxyl-functional polyamide alcohols are hydroxyl-terminated poly(meth)acrylate diols.

Particularly preferred are the hydroxy-functional polyesters as component (C).

Component (D) are polyisocyanates selected from the group of aromatic, araliphatic, aliphatic or cycloaliphatic polyisocyanates or mixtures of such polyisocyanates (D). Preferred polyisocyanates are selected from the group of 1,3-cyclohexane diisocyanate, 1-methyl-2,4-diisocyanatocyclohexane, 1-methyl-2,6-diisocyanatocyclohexane, tetramethylene diisocyanate, 4,4'-diisocyanatodiphenylmethane, 2,4'-diisocyanatodiphenylmethane, 2,4-diisocyanatotoluene, 2,6-diisocyanatotoluene, α,α,α,α,-tetra-methyl-m-, or p-xylylene diisocyanate, 1,6-hexamethylene diisocyanate, 1-isocyanato-3,3,5-trimethyl-5-isocyanatomethylcyclohexane (isophorone diisocyanate or IPDI), 4,4'-diisocyanatodicyclohexylmethane and also mixtures thereof, optionally also with other isocyanates and/or higher-functionality homologs and/or oligomers with urethane, biuret, carbodiimide, isocyanurate, allophanate, iminooxadiazinedione and/or uretdione groups.

The polyisocyanate component (D) preferably contains at least 60% by weight of cycloaliphatic and/or aliphatic isocyanates with a functionality of at least two.

With particular preference the polyisocyanate component (D) comprises 1-isocyanato-3,3,5-trimethyl-5-isocyanatomethylcyclohexane (isophorone diisocyanate or IPDI), 1-methyl-2,4/(2,6)-diisocyanatocyclohexane, 4,4'-diisocyanatodicyclohexyl methane and/or 1,6-hexamethylene diisocyanate.

Suitable oligo(meth)acrylates (E) comprehend the compounds of component (A1) which have a double-bond density of greater than 2.0 mol of double bonds/kg of substance, preferably greater than 3.0 mol of double bonds/kg of substance, particular preferably greater than 5.0 mol of double bonds/kg of substance.

Component (E) is preferably selected from the group of (meth)acrylates of tetrols and hexyls, such as (meth)acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol and/or the technical mixtures that are obtained in the (meth) acrylicization of the aforementioned compounds. The oligo (meth)acrylates (E) can also be used in mixtures.

The molar mass is raised by using monoamines, diamines, polyamines and/or amino alcohols as component (F). Preferred diamines and/or polyamines are those which are more reactive towards the isocyanate groups than is water, since the extension of the polyester urethane (meth)acrylate takes place optionally in the aqueous medium. Particular preference is given to the diamines and/or polyamines selected from the group of ethylenediamine, 1,6-hexamethylenediamine, isophoronediamine, 1,3-, 1,4-phenylenediamine, 4,4'-diphenylmethanediamine, amino-functional polyethylene oxides, amino-functional polypropylene oxides (known under the name Jeffamin®, D series [Huntsman Corp. Europe, Zavantem, Belgium]), triethylenetetramine and hydrazine. Especially preferred is ethylenediamine.

Preferred monoamines are selected from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

For the preparation of the polyester (meth)acrylate urethane dispersions of the invention it is possible to use all of the processes known in the art, such as emulsifier/shearing force processes, acetone processes, prepolymer mixing processes, melt emulsification processes, ketimine and solids/spontaneous dispersing processes or derivatives of these processes. A compilation of these methods is given in Methoden der Organischen Chemie, Houben-Weyl, 4th edition, volume E20/part 2 on page 1682, Georg Thieme Verlag, Stuttgart, 1987. Preference is given to the melt emulsification process and the acetone process. The acetone process is particularly preferred.

For the preparation of the reaction product according to step I) the components (A), (B) and (C) are introduced as an initial charge to the reactor and this initial charge is diluted optionally with acetone. In order to accelerate the addition of isocyanate, isocyanate addition reaction catalysts are added that are selected from the group of triethylamine, 1,4-diazabicyclo[2.2.2]octane, tin dioctoate or dibutyltin dilaurate, and the mixture is heated in order to allow onset of the reaction. Generally this requires temperatures of 30 to 60° C. Subsequently the polyisocyanate or polyisocyanates (D) is or are added dropwise. The converse variant is also possible, where in that case the polyisocyanates (D) are introduced as an initial charge and the isocyanate-reactive components (A), (B) and (C) are added.

For the monitoring of the reaction the NCO content is determined at regular intervals by way of titration, infrared spectroscopy or near-infrared spectroscopy.

The molar ratios of isocyanate-reactive groups in (A), (B) and (C) to isocyanate groups in (D) are from 0.8:1 to 2.5:1, preferably 1.2:1 to 1.5:1.

Preparation of the production of the product according to step I) of the process of the invention from components (A) to (D) is followed, if it has not already been carried out in the starting molecules, by the formation of salts of the ionically dispersive centres of the compounds (B). This is done using preferably bases selected from the group of triethylamine, ethyldiisopropylamine, dimethylcyclohexylamine, dimethylethanolamine, ammonia, N-ethylmorpholine, LiOH, NaOH and/or KOH. Where only compounds containing ether groups are used as component (B), this neutralization step is absent.

Subsequent to step I), an oligo(meth)acrylate (E) or a mixture of oligo(meth)-acrylates (E) is added. As soon as they have dissolved, the last reaction step follows, in which there is an increase in molar mass in the aqueous medium, and the polyester (meth)acrylate urethane dispersions needed for the coating system of the invention are formed: the polyurethane synthesized according to step I) from components (A) to (D), and the oligo(meth)acrylate or acrylates (E), in solution in acetone, are introduced with vigorous stirring into the dispersing water which comprises the polyamine or polyamines (F), or, conversely, the dispersing water/polyamine mixture is stirred into the polyurethane-oligo(meth)acrylate acetone solution. This is optionally then followed by an increase in the molar mass through reaction of remaining isocyanate groups of the reaction products according to step I) from (A) to (D) with the aminic compounds (F). Also formed are the dispersions which are present in the coating system of the invention. The amount of polyamine (F) employed depends on the unreacted isocyanate groups still present. The reaction of the remaining free isocyanate groups with the polyamine (F) may take place to an extent of 35% to 150%. Where a substoichiometric amount of polyamine (F) is used, free isocyanate groups are consumed slowly by reaction with water. Where an excess of polyamine (F) is used, there are no longer any unreacted isocyanate groups present, and an amine-functional polyester (meth)acrylate urethane is obtained. Preferably 50% to 100%, more preferably 60% to 96% of the remaining free isocyanate groups are reacted with the polyamine (F).

In one variant of the process it is also possible for the dispersing step to be carried out first, with the subsequent addition of component (F), advantageously in dilution in water.

In a further variant it is possible to carry out the increase in molar mass by the polyamine (F) in acetonic solution before or after the addition of the oligo(meth)acrylates (E).

If desired it is possible for the organic solvent—where present—to be removed by distillation. The dispersions then have a solids content of 20% to 60% by weight, more particularly 30% to 58% by weight.

It is likewise possible to carry out dispersing step and distillation step in parallel, in other words simultaneously.

Through the addition of the oligo(meth)acrylates (E) immediately prior to the dispersing step, component (E) is codispersed with the polyurethane synthesized from components (A) to (D). The incorporation of the oligo(meth)acrylates (E), which can contain hydroxyl groups, into the polyurethane backbone is unwanted and is prevented by their addition shortly before the dispersing step.

Following the evaporation of the water, the dispersions of the invention give rise to transparent films. As a result of subsequent radiation-chemically induced crosslinking and/or free radically induced crosslinking, the films cure to form particularly high-quality, scratch-resistant and chemical-resistant coatings.

In the case of radiation-chemically induced polymerization by means of UV, electron, X or gamma rays, UV curing is particularly preferred. UV curing is initiated in the presence of photoinitiators. Among the photoinitiators a distinction is made in principle between two types: the unimolecular (type I) and the bimolecular (type II) initiators. Suitable type I systems are aromatic ketone compounds selected from the group of benzophenones in combination with tertiary amines, alkylbenzophenones, 4,4'-bis(dimethylamino)benzophenone (Michler's ketone), anthrone and halogenated benzophenones or mixtures of the aforementioned types. Of further suitability are type II initiators such as benzoin and its derivatives, benzil ketals, acylphosphine oxides, 2,4,6-trimethylbenzoyl-diphenylphosphine oxide, bisacylphosphine oxides, phenylglyoxylic esters, camphorquinone, α-aminoalkylphenones, α,α-dialkoxyacetophenones and α-hydroxyalkylphenones. Preference is given to photoinitiators which are easy to incorporate into aqueous coating materials. Examples of such products are Irgacure® 500 (a mixture of benzophenone and 1-hydroxycyclohexyl phenyl ketone, Ciba, Lampertheim, DE), Irgacure® 819 DW (phenylbis-(2,4,6-trimethylbenzoyl)phosphine oxide, Ciba, Lampertheim, DE), Esacure® KIP EM (oligo-[2-hydroxy-2-methyl-1-[4-(1-methylvinyl)phenyl]propanones], Lamberti, Aldizzate, Italy). Mixtures of these compounds can also be used.

For the incorporation of the photoinitiators it is also possible to use polar solvents selected from the group of acetone and isopropanol.

Optionally the UV curing will be carried out advantageously at 30-70° C., since at a higher temperature the degree of conversion of (meth)acrylate groups tends to be increased. This may result in better resistance properties. In the case of UV curing, however, it is also necessary to take account of the possible temperature sensitivity of the substrate, and so optimum curing conditions for a particular coating material/substrate combination must be determined by the skilled person in simple tests.

Optionally, curing takes place under an inert gas atmosphere, i.e. in the absence of oxygen, in order to prevent oxygen inhibition of the free-radical crosslinking.

Where curing takes place thermally free-radically, suitable initiators are water-soluble peroxides or aqueous emulsions of non-water-soluble initiators. These radical generators can be combined in a known way with accelerators.

The coating systems of the invention can be applied to any of a very wide variety of substrates by the typical techniques, preferably spraying, rolling, flooding, printing, knife coating, casting, spreading and dipping.

The coating systems of the invention can be used to paint or coat all substrates in principle. Preferred substrates are selected from the group of mineral substrates, wood, wood-based materials, furniture, wood-block flooring, doors, window frames, metallic articles, plastics, paper, cardboard, cork or leather. In these contexts they are suitable as a primer and/or as a topcoat material. Additionally the coating systems of the invention can be used as or in adhesives, such as in contact adhesives, in heat-actionable adhesives or in laminating adhesives, for example.

The coating systems of the invention can be used alone but can also be used in binder mixtures with other dispersions. These may be dispersions which likewise contain unsaturated groups selected from the group of unsaturated dispersions that contain polymerizable groups and are based on polyester, polyurethane, polyepoxy (meth)acrylate, polyether, polyamide, polysiloxane, polycarbonate, epoxy acrylate, addition polymer, polyester acrylate, polyurethane polyacrylate and/or polyacrylate.

Dispersions of this kind based on polyesters, polyurethanes, polyepoxy (meth)acrylates, polyethers, polyamides, polyvinyl esters, polyvinyl ethers, polysiloxanes, polycarbonates, addition polymers and/or polyacrylates may also be present in the coating systems of the invention which contain functional groups, such as alkoxysilane groups, hydroxy groups and/or isocyanate groups optionally present in blocked form. In this way it is possible to produce dual-cure systems which can be cured via two different mechanisms.

It is also possible for dispersions based on polyesters, polyurethanes, polyepoxy (meth)acrylates, polyethers, polyamides, polysiloxanes, polyvinyl ethers, polybutadienes, polyisoprenes, chlorinated rubbers, polycarbonates, polyvinyl esters, polyvinyl chlorides, addition polymers, polyacrylates, polyurethane polyacrylate, polyester acrylate, polyether acrylate, alkyd, polycarbonate, polyepoxy, epoxy acrylate basis to be present in the coating systems of the invention that contain no functional groups. In this way it is possible to reduce the degree of the crosslinking density—which influences—e.g. accelerates—physical drying, or to perform elastification or else an adaptation of adhesion.

Coating materials which comprise the coating systems of the invention may also have amino crosslinker resins, based on melamine or urea, and/or polyisocyanates with free or with blocked polyisocyanate groups, based on polyisocyanates which optionally contain hydrophilicizing groups and derive from hexamethylene diisocyanate, isophorone diisocyanate and/or tolylidine diisocyanate with urethane, uretdione, iminooxadiazinedione, isocyanurate, biuret and/or allophanate structures, added to the coating systems of the invention. Further possible crosslinkers include carbodiimides or polyaziridines.

The coating systems of the invention can be combined and/or admixed with the conventional paint-technology binders, auxiliaries and adjuvants, selected from the group of pigments, dyes or matting agents. These are flow-control and wetting additives, slip additives, pigments, including metallic effect pigments, fillers, nanoparticles, photoprotective particles, anti-yellowing additives, thickeners and additives for reducing the surface tension.

The coating systems of the invention are particularly suitable for wood applications and plastics applications with a pigment content≥10% by weight, based on the overall formulation.

The coating systems of the invention are likewise particularly suitable for wood applications and plastics applications on everyday articles which are subject to severe wear, such as mobile phone casings, where high gloss, low scratchability and good resistance to chemicals, such as sun cream, are examples of important factors.

EXAMPLES

1) Preparation of an Inventive, UV-Curable, Aqueous Polyurethane Dispersion for Use as a Binder for Hard, Pigmentable Coating Materials 241.5 parts of the polyepoxy acrylate Ebecryl® 600 (Cytec Surface Specialties SA/NV, Drogenbos, Belgium), component (A), 127.27 parts of the polyester Desmophen® PE 170 HN (Bayer Material Science AG, Leverkusen, DE), component (A), 5.25 parts of neopentyl glycol, component (C), 31.98 parts of dimethylolpropionic acid, component (B), 323.10 parts of 4,4'-diisocyanatodicyclohexylmethane, component (D), and 0.7 part of dibutyltin dilaurate are dissolved in 200 parts of acetone and reacted with stirring at 50° C. to an NCO content of 3.7% by weight. Added and stirred into the resulting prepolymer solution is a mixture of 80.50 parts of the propoxylated glycerol triacrylate OTA 480 (Cytec Surface Specialties SA/NV, Drogenbos, Belgium), component (E), and 78.32 parts of the ditrimethylolpropane tetraacrylate Ebecryl® 140 (Cytec Surface Specialties SA/NV, Drogenbos, Belgium), component (E). This is followed by neutralization, accomplished by adding and stirring in 22.93 parts of triethylamine. The clear solution is introduced with stirring into 1150 parts of water. At this point a mixture of 22.36 parts of ethylenediamine, component (F), and 134.2 parts of water is added to the dispersion with stirring. Subsequently the acetone is removed from the dispersion by distillation under a gentle vacuum. This gives an inventive, UV-curable aqueous polyurethane dispersion 1) having a solids content of 42% by weight, an average particle size of 121 nm and a pH of 8.4.

2) Preparation of an Inventive, UV-Curable, Aqueous Polyurethane Dispersion for Use as a Binder for Hard, Pigmentable Coating Materials 322.00 parts of the polyepoxy acrylate Ebecryl® 6040 (Cytec Surface Specialties SA/NV, Drogenbos, Belgium), component (A), 127.5 parts of the polyester Desmophen® PE 170 HN (Bayer Material Science AG, Leverkusen, DE), component (A), 5.25 parts of neopentyl glycol, component (C), 31.98 parts of dimethylolpropionic acid, component (B), 323.10 parts of 4,4'-diisocyanatodicyclohexylmethane, component (D), and 0.7 part of dibutyltin dilaurate are dissolved in 200 parts of acetone and reacted with stirring at 50° C. to an NCO content of 3.7% by weight. Added and stirred into the resulting prepolymer solution is a mixture of 16.29 parts of the polyether acrylate Desmolux® 6958 (Bayer Material Science AG, Leverkusen, DE), component (E), and 62.5 parts of the ditrimethylolpropane tetraacrylate Ebecryl® 140 (Cytec Surface Specialties SA/NV, Drogenbos, Belgium), component (E). This is followed by neutralization, accomplished by adding and stirring in 22.93 parts of triethylamine. The clear solution is introduced with stirring into 1150 parts of water. At this point a mixture of 22.36 parts of ethylenediamine, component (F), and 134.2 parts of water is added to the dispersion with stirring. Subsequently the acetone is removed from the dispersion by distillation under a gentle vacuum. This gives an inventive, UV-curable aqueous polyurethane dispersion 2) having a solids content of 41% by weight, an average particle size of 61 nm and a pH of 8.7.

3) Preparation of an Inventive, UV-Curable, Aqueous Polyurethane Dispersion for Use as a Binder for Hard, Pigmentable Coating Materials 322.00 parts of the polyepoxy acrylate Ebecryl® 6040 (Cytec Surface Specialties SA/NV, Drogenbos, Belgium), component (A), 127.5 parts of the polyester Desmophen® PE 170 HN (Bayer Material Science AG, Leverkusen, DE), component (A), 5.25 parts of neopentyl glycol, component (C), 31.98 parts of dimethylolpropionic acid, component (B), 323.10 parts of 4,4'-diisocyanatodicyclohexylmethane, component (D), and 0.7 part of dibutyltin dilaurate are dissolved in 200 parts of acetone and reacted with stirring at 50° C. to an NCO content of 3.7% by weight. Added and stirred into the resulting prepolymer solution is a mixture of 16.83 parts of the polyester acrylate Laromer® PE 44 F (BASF AG, Ludwigshafen, DE), component (E), and 62.5 parts of the ditrimethylolpropane tetraacrylate Ebecryl® 140 (Cytec Surface Specialties SA/NV, Drogenbos, Belgium), component (E). This is followed by neutralization, accomplished by adding and stirring in 22.93 parts of triethylamine. The clear solution is introduced with stirring into 1150 parts of water. At this point a mixture of 22.36 parts of ethylenediamine, component (F), and 134.2 parts of water is added to the dispersion with stirring. Subsequently the acetone is removed from the dispersion by distillation under a gentle vacuum. This gives an inventive, UV-curable aqueous polyurethane dispersion 3) having a solids content of 43.6% by weight, an average particle size of 66 nm and a pH of 8.7.

4) Preparation of the Polyester Acrylate A1) as Per Example 1 in EP-B 872 502

224.9 parts of hexane-1,6-diol, 96.6 parts of trimethylolpropane, 146.0 parts of adipic acid, 144.3 parts of acrylic acid, 3.1 parts of p-toluenesulphonic acid, 1.7 parts of hydroquinone monomethyl ether, 0.6 part of 2,6-di-tert-butylcresol and 250 of n-heptane are reacted for 10 hours at 96° C. with stirring, refluxing and water separation. Subsequently the solvent is removed by distillation. The OH number is 165 mg KOH/g, the acid number 1.0 mg KOH/g and the dynamic viscosity 520 mPas, measured to DIN 53018 at 23° C.

5) Preparation of the Adduct f1) as Per Example 1 in EP-B 872 502

A reaction vessel provided with stirrer, thermometer, dropping funnel, reflux condenser and controllable heating is charged with 55.0 parts of 2-hydroxyethyl acrylate and 0.059 part of dibutyltin oxide. With air passed intensively through this initial charge, the charge is heated to 110° C., and 45.94 parts of ε-caprolactone are metered in via the dropping funnel over the course of 1 hour. The mixture is heated with stirring at 110° C. for 3 hours more until a viscosity in the range of 66-70 sec at 23° C. (DIN EN ISO 2431) is reached.

6) Preparation of an Aqueous, UV-Curable Polyurethane Dispersion as Per Example 1 in EP-B 872 502

A mixture of 200 parts of the polyester acrylate 4), 68.4 parts of the adduct 5), 36.0 parts of dimethylolpropionic acid and 23.9 parts of triethylamine is admixed dropwise over the course of 3 hours at temperatures from 55 to 70° C. with 214.0 parts of 1-isocyanato-3,3,5-trimethyl-5-isocyanatomethylcyclohexane, with stirring. During the subsequent reaction at the temperature of 75 to 80° C., the NCO content falls to the constant level of 2.2% by weight. Subsequently the resulting prepolymer is dispersed in 749.4 parts of water at a temperature of 38 to 42° C., with vigorous stirring. After that the resulting dispersion is admixed dropwise with a mixture of 9.6 parts of ethylenediamine and 14.3 parts of water over the course of 15 minutes at the same temperature. After that, stirring is continued until isocyanate at 2270 cm$^{-1}$ can no longer be detected by IR spectroscopy. This gives a UV-curable, aqueous polyurethane dispersion 6) as per example 1 in EP-B 872 502, having a solids content of 40% by weight, an average particle size of 99 nm and a pH of 7.6.

7) Preparation of an Aqueous, UV-Curable Polyurethane Dispersion as Per Example A.1 in EP-B 1 311 639

In a four-necked flask equipped with KPG stirrer, reflux condenser, thermometer and nitrogen blanketing, the first half of a pre-prepared polyol mixture comprising 36.47 parts of the polyester acrylate Laromer® LR 8800 (BASF AG, Ludwigshafen, DE), 145.90 parts of the polyester Bester® 42H (Poliolchimica S.p.A., Parona Lomellina, Italy), 14.59 parts of 1,4-butanediol, 21.88 parts of dimethylolpropionic acid, 0.58 part of 2,6-di-tert-butyl-p-cresol and 72.95 parts of N-methylpyrrolidone are stirred with 136.14 parts of 1-isocyanato-3,3,5-trimethyl-5-isocyanatomethylcyclohexane at 80-90° C. under nitrogen blanketing for approximately one hour. After the addition of the second half of the pre-prepared polyol mixture, stirring is continued at 80-90° C. with nitrogen blanketing until an NCO content of 3.70% by weight is reached. The course of the reaction is monitored by means of titration. Then the prepolymer is dispersed with intensive stirring into a mixture of 547 parts of mains water and 16.51 parts of triethylamine, and the dispersion is then chain-extended with 11.32 parts of ethylenediamine in order to construct the polyurethane dispersion. This gives a UV-curable, aqueous polyurethane dispersion 7) as per example A.1 in EP-B 1 311 639, having a solids content of 39% by weight, an average particle size of 173 nm and a pH of 8.5.

8) Preparation of an Inventive, UV-Curable, Aqueous Polyurethane Dispersion for Use as a Binder for Hard High-Gloss Coating Materials 400.62 parts of the polyester acrylate Laromer® PE 44 F (BASF AG, Ludwigshafen, DE), component (A), 4.78 parts of neopentyl glycol, component (C), 33.99 parts of dimethylolpropionic acid, component (B), 199.74 parts of 4,4'-diisocyanatodicyclohexylmethane, component (D), and 0.6 part of dibutyltin dilaurate are dissolved in 200 parts of acetone and reacted with stirring at 50° C. to an NCO content of 1.4% by weight. Added and stirred into the resulting prepolymer solution are 200.00 parts of the ethoxylated pentaerythritol tetraacrylate Miramer® M4004 (Rahn AG, Zürich, CH), component (E). This is followed by neutralization, accomplished by adding and stirring in 23.58 parts of triethylamine. The clear solution is introduced with stirring into 1235 parts of water. At this point a mixture of 7.99 parts of ethylenediamine, component (F), and 24.00 parts of water is added to the dispersion with stirring. Subsequently the acetone is removed from the dispersion by distillation under a gentle vacuum. This gives an inventive, UV-curable aqueous polyurethane dispersion having a solids content of 42.0% by weight, an average particle size of 86 nm and a pH of 8.3.

9) Preparation of an Inventive, UV-Curable, Aqueous Polyurethane Dispersion for Use as a Binder for Hard High-Gloss Coating Materials 400.62 parts of the polyester acrylate Laromer® PE 44 F (BASF AG, Ludwigshafen, DE), component (A), 4.78 parts of neopentyl glycol, component (C), 33.99 parts of dimethylolpropionic acid, component (B), 199.74 parts of 4,4'-diisocyanatodicyclohexylmethane, component (D), and 0.6 part of dibutyltin dilaurate are dissolved in 200 parts of acetone and reacted with stirring at 50° C. to an NCO content of 1.4% by weight. Added and stirred into the resulting prepolymer solution are 200.00 parts of the pentaerythritol triacrylate Agi-Syn® 2884 (AGI Co., Taipei, Taiwan), component (E). This is followed by neutralization, accomplished by adding and stirring in 23.58 parts of triethylamine. The clear solution is introduced with stirring into 1235 parts of water. At this point a mixture of 7.99 parts of ethylenediamine, component (F), and 24.00 parts of water is added to the dispersion with stirring. Subsequently the acetone is removed from the dispersion by distillation under a gentle vacuum. This gives an inventive, UV-curable aqueous polyurethane dispersion 9) having a solids content of 42.5% by weight, an average particle size of 173 nm and a pH of 8.3.

TABLE 1

Formulations for pigmented systems

| | Pigmented coating materials [A-1] and [A-2] (parts by weight) | Transparent coating material [A-3] (parts by weight) |
|---|---|---|
| UV dispersion (adapted to 40% solids content) | 74.5 | 150 |
| Butyl glycol/water (1:1) | 6.0 | 12 |
| Anti-foam agent BYK ® 028 A*[1] | 0.2 | — |
| Irgacure ® 500[2] | 0.5 | 1.5 |
| Irgacure ® 819 DW[3] | 0.5 | — |
| Wetting agent BYK ® 346[4] | 0.5 | 0.3 |
| TiO$_2$-Paste (67% TiO$_2$) | 15 | — |
| Thickening agent BYK ® 425[5] | 1 | 0.4 |
| Water | 1.8 | — |
| Total | 100.0 | 164.2 |

[1]Mixture of foam-destroying polysiloxanes and hydrophobic solids in polyglycol from BYK, Wesel, DE
[2]A mixture of benzophenone and 1-hydroxycyclohexyl phenyl ketone from Ciba, Lampertheim, DE
[3]Phenylbis(2,4,6-trimethylbenzoyl)phosphine oxide from Ciba, Lampertheim, DE
[4]Solution of a polyether-modified polydimethylsiloxane from BYK, Wesel, DE
[5]Solution of a urea-modified polyurethane from BYK, Wesel, DE

TABLE 2

Application and curing conditions for pigmented systems

| | Pigmented coating materials [A-1] | Pigmented coating materials [A-2] | Transparent coating material [A-3] |
|---|---|---|---|
| Substrate | polyester film | glass | glass |
| Application by knife coating | box-type coating bar, 1 × 150 μm, wet film | box-type coating bar, 1 × 150 μm, wet film | box-type coating bar, 1 × 150 μm, wet film |
| Flash-off time | 10 min, 50° C. | 10 min, 50° C. | 10 min, 50° C. |
| Curing | 5 m/min (Ga + Hg)[6] | 3, 5 m/min[7] (Ga + Hg)[6] | 3, 5, 10 m/min (Hg)[6] |

[6]UV unit from Barberán, Model HOK - 6/2 (approximately 80 W/cm)
[7]For the reactivity test, the hardness achieved after curing is measured in pendulum seconds as a function of different belt running speeds. Where the pendulum hardness remains at levels above 100 pendulum seconds even at the highest belt speed, the reactivity possessed by the coating is excellent.

After UV curing, the coated substrates are stored at room temperature for 16 hours and then subjected to the tests.

TABLE 3

Data on the performance testing of pigmented systems

| Performance testing | Example 1 | Example 2 | Example 3 | Example 6 (EP-B 872 502) | Example 7 (EP-B 1 311 639) |
|---|---|---|---|---|---|
| Film transparency[8], transparent coating material [A-3] | 5 | 5 | 5 | 5 | 1 |
| Storage stability: 50° C./24 h | OK | OK | OK | OK | OK |
| Storage stability: 40° C./28 d | OK | OK | OK | OK | OK |
| Water resistance[9], pigmented coating material [A-1] | 5 | 5 | 4-5 | 5 | 1 |
| Coffee resistance[9], pigmented coating material [A-1] | 5 | 4 | 3 | 3 | 2 |
| Ethanol/water (50%) resistance,[9] pigmented coating material [A-1] | 4-5 | 4 | 4 | 1 | 1 |
| Red wine resistance[9], pigmented coating material [A-1] | 4 | 4-5 | 3 | 3 | 1 |
| Ethanol resistance (98%)[9], pigmented coating material [A-1] | 1 | 4 | 2-3 | 1 | 1 |
| Ethyl acetate resistance,[9] pigmented coating material [A-1] | 5 | 5 | 5 | 5 | 4 |
| Ammonia resistance,[9] pigmented coating material [A-1] | 5 | 5 | 5 | 4 | 4 |
| König pendulum hardness, DIN 53157, transparent coating material [A-3] after physical drying | 45 sec | 35 sec | 30 sec | 24 sec | 10 sec |
| König pendulum hardness, DIN 53157, transparent coating material [A-3] after UV curing | 137 sec, 136 sec, 122 sec | 148 sec, 146 sec, 113 sec | 148 sec, 116 sec, 104 sec | 147 sec, 120 sec, 105 sec | 40 sec, 37 sec, 37 sec |
| König pendulum hardness, DIN 53157, pigmented coating material [A-2] | 119 sec, 111 sec | 125 sec, 115 sec | 126 sec, 118 sec | 67 sec, 52 sec | 11 sec, 6 sec |
| Whitening after scratching, transparent coating material[10], transparent coating material [A-3] | 3 | 2 | 4 | 5 | 2 |
| Breaking extension 19, transparent coating material [A-5] | <2% | 3% | <2% | 5% | 380% |

[8]The film transparency is assessed visually by drawing down a film on a glass plate and subsequently subjecting it to physical drying:
Rating 5: clear, no hazing or fogging perceptible
Rating 4: at a viewing angle of about 10-20° slight fogging is perceptible
Rating 3: at a viewing angle of about 45-80° slight hazing is perceptible
Rating 2: distinct hazing
Rating 1: matt surface or gritty surface
[9]The resistance properties are assessed after 16 hours of exposure, by means of visual inspection:
Rating 5: no visible changes (no damage).
Rating 4: slight change in gloss or hue, visible only when the light source is reflected by the test surface at or close to the mark and directly into the eye of the viewer, or a few isolated markings which are just perceptible (swelling ring perceptible, and/or no softening apparent with the fingernail).
Rating 3: slight marking visible from a number of viewing angles, for example an almost complete circle or circular area just perceptible (swelling ring perceptible, scratch traces of the fingernail perceptible).
Rating 2: severe marking, but the surface structure is largely unchanged (closed swelling ring, scratch traces observable).
Rating 1: severe marking, but the surface structure is largely unchanged, marking can be scratched through down to the substrate.
Rating 0: severe marking; the surface structure is changed or the surface material has been wholly or partly destroyed, or the filter paper adheres to the surface.
[10]The whitening after scratching is tested by scratching with a coin. If there is no whitening at all apparent at the scratched site, then this result is assessed as excellent (rating 5).

TABLE 4

Formulations for transparent coating systems

| | Transparent coating materials [A-4], [A-5] and [A-6] (parts by weight) |
|---|---|
| UV-dispersion (adapted to 40% solids content) | 96.5 |
| Wetting agent BYK ® 348[11] | 1.0 |
| Irgacure ® 127[12] | 2.5 |
| Total | 100.0 |

After UV curing the coated substrates are stored at room temperature for 16 h and then subjected to the tests.
[11]Solution of a polyether-modified polydimethylsiloxane from BYK, Wesel, DE
[12]31% strength solution of hydroxy-1-{4-[4-(2-hydroxy-2-methylpropionyl)benzyl]phenyl}-2-methylpropan-1-one in acetone from Ciba, Lampertheim, DE

TABLE 5

Application and curing conditions for transparent coating systems

|  | Transparent coating material [A-4] | Transparent coating material [A-5] | Transparent coating material [A-6] |
|---|---|---|---|
| Substrate | glass | glass | Pocan S 1506[13] |
| Application by knife coating | box-type coating bar, 1 × 150 μm, wet film | box-type coating bar, 1 × 250 μm, wet film | spiral-wound coating bar, 1 × 100 μm, wet film |
| Flash-off time | 45 min, 50° C. | 16 h, 50° C. | 45 min, 50° C. |
| IR-drying | 60-70° C. surface temperature | 60-70° C. surface temperature | 60-70° C. surface temperature |
| Curing | Hg[14] | Hg[14] | Hg[14] |

[13] polybutylene terephthalate from Lanxess, Leverkusen, DE
[14] UV unit from Cefla, 1 (approximately 120 W/cm, approximately 1000 mJ/cm$^2$)

TABLE 6

Data on the performance testing of transparent coating systems

| Performance testing | Example 1 | Example 6 (EP-B 872 502) | Example 7 (EP-B 1 311 639) | Example 8 | Example 9 |
|---|---|---|---|---|---|
| Film transparency[8], transparent coating material [A-4] | 1 | 5 | 1 | 5 | 4 |
| Gloss (20°/60°)[15], transparent coating material [A-6] | 83%/90% | 86%/89% | 1%/11% | 83%/89% | 83%/90% |
| Sun cream resistance (optical/adhesion)[16], transparent coating material [A-6] | 4/GT = 0 | 0/GT = 5 | 0/GT = 4 | 5/GT = 0 | 5/GT = 0 |
| Methanol resistance[17], transparent coating material [A-6] | 5 | 5 | 5 | 5 | 5 |
| Pencil hardness[18], transparent coating material [A-4] | H | F | <F | F | 2 H |
| König pendulum hardness, DIN 53157, transparent coating material [A-4] | 186 sec | 195 sec | 42 sec | 178 sec | 190 sec |
| Breaking extension[19], transparent coating material [A-5] | <2% | 5% | 380% | <2% | 3% |

[15] The gloss (20° angle) of the cured transparent coating drawdowns on plastics [A-6] were determined using a "micro-trigloss" from BYK Gardner.
[16] The resistance properties are assessed after 16 hours of exposure, by means of visual inspection (cf. footnote 9). In addition, adhesion by means of cross-cut was carried out on the exposed area in accordance with DIN EN ISO 2409 (GT = 0 no detachment, perfect adhesion).
[17] For the determination, 5 double rubs with a methanol-soaked cotton pad were carried out on the cured plastic drawdowns [A-6]. Assessment was by inspection (cf. footnote 9).
[18] "CH-ZSH 2090 Pencilhardness Tester" from Zehntner Testing Instruments, ISO 15184, EN 13523-4, angle 45°, applied weight 1000 g, 5 cycles, Mitsubishi pencils
[19] For the determination of the breaking extension, the glass plate of the cured glass-plate drawdowns of transparent coating materials [A-5] were stored in water for approximately 5 minutes. In the course of this time the film underwent detachment from the glass plate. It was then dried at 50° C. for 16 h, after which the breaking extension was determined in accordance with EN ISO 527.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing hard, radiation-curable coating systems, based on aqueous polyurethane dispersions, comprising the following steps:
   I) reacting by polyaddition:
      A) 40% to 80% by weight of a hydroxyl-containing component containing
         A1) 10% to 80% by weight, based on the sum of components (A) to (F), of one or more hydroxyl-containing prepolymers selected from the group of polyesters, polyethers, polyepoxy (meth)acrylates and polyurethanes having an OH number in the range from 40 to 300 mg KOH/g and containing groups which, under exposure to high-energy radiation, undergo polymerization reaction with ethylenically unsaturated double bonds,
      and optionally
         A2) 0% to 50% by weight, based on the sum of components (A) to (F), of one or more alcohols containing (meth)acrylate groups and having an OH number in the range from 35 to 1000 mg KOH/g,
      B) 0.1% to 20% by weight of one or more compounds that are reactive towards isocyanate groups and act dispersively for the polyurethane dispersion, and
      C) 0% to 30% by weight of hydroxy-functional compounds selected from the group consisting of diols, triols, polyesters, polycarbonates, polyurethanes, $C_2$, $C_3$, and/or $C_4$ polyethers, polyether esters and polycarbonate polyesters, the diols and triols having a molecular weight in the range from 62 to 242 g/mol, and the polyesters, polycarbonates, polyurethanes, $C_2$, $C_3$, and/or $C_4$ polyethers, polyether esters and polycarbonate polyesters having in each case a molecular weight in the range from 700 to 4000 g/mole,
   with
      D) 10% to 50% by weight of one or more polyisocyanates to form a polyurethane and thereafter
   II) adding:
      E) 2% to 40% by weight of oligo(meth)acrylates selected from the group of component (A1) having a double bond density of greater than 2.0 mol of double bonds/kg of substance and through exposure to high-energy radiation undergoing polymerization reaction with ethylenically unsaturated compounds, and/or oligo(meth)acrylates based on (meth)acrylate esters, obtainable by esterification of (meth)acrylic acid with alcohols selected from the group of tetrols and hexols, III) subsequently dispersing the product obtained according to step II in water to form an aqueous polyurethane dispersion, and IV) reacting the aqueous polyurethane dispersion obtained from step III) with F) 0.1% to 10% by weight of one or more mono-, di-, or polyamines and/or amino alcohols, the fractions of components (A) up to (F) adding up to 100% by weight and the coating systems, after curing, having a König pendulum hardness of greater than 60 sec for an applied film with a wet thickness of 150 μm and a breaking extension of less than 150% for an applied film with a wet thickness of 250 μm.

2. Process according to claim 1, where components (A), (B) and (C) are introduced as an initial charge to the reactor, optionally in dilution with a solvent which is miscible with water but inert towards isocyanate groups, and this initial charge is heated to temperatures of 30 to 60° C., with isocyanate addition reaction catalysts being optionally added to the mixture of the compounds (A), (B) and (C) before the reaction takes place with the polyisocyanate or polyisocyanates (D); the molar ratios of isocyanate-reactive groups in (A), (B) and (C) to isocyanate groups in (D) being situated in the range from 0.8:1 to 2.5:1, and the polyurethane obtained according to step I) being dissolved with the reactive oligo(meth)acrylate (E) in acetone, to form an oligo(meth)acrylate-acetone solution, and, with vigorous stirring according to step III and IV), either this solution being introduced into the dispersing water comprising the polyamine or polyamines (F) or, conversely, the dispersing water/polyamine mixture being added to the polyurethane-oligo(meth)acrylate-acetone solution, after which, optionally, the acetone is removed by distillation.

3. Hard, radiation-curable coating systems obtained by the process according to claim 1.

4. Coating system according to claim 3, wherein the degree of neutralization of the acids and/or bases introduced through component (B) is from 50% to 125%.

5. Coating system according to claim 3, wherein the reaction V) of the remaining free isocyanate groups of the prepolymer by component (F) takes place to an extent of 35% to 150%.

6. Coating system according to claim 3, wherein 2% to 40% by weight of oligo(meth)acrylates (E) based on (meth)acrylate esters obtained from the esterification of (meth)acrylic acid with alcohols selected from the group consisting of tetrols and hexols are present.

7. Coating system according to claim 3, wherein 2% to 40% by weight of oligo(meth)acrylates (E) based on polyester (meth)acrylates having an OH number in the range from 30 to 300 mg KOH/g are present.

8. Coating system according to any one of claim 3, wherein 2% to 40% by weight of oligo(meth)acrylates (E) based on polyether (meth)acrylates having an OH number in the range from 5 to 200 mg KOH/g are present.

9. Coating system according to claim 3, wherein 2% to 40% by weight of oligo(meth)acrylates (E) based on polyepoxy (meth)acrylates having an OH number in the range from 20 to 300 mg KOH/g are present.

10. Coating system according to claim 3, wherein 2% to 40% by weight of oligo(meth)acrylates (E) based on polyurethane (meth)acrylates having an OH number in the range from 20 to 300 mg KOH/g are present.

11. Coating system obtainable according to claim 3, wherein 2% to 40% by weight of mixtures of oligo(meth)acrylates (E) selected from the group consisting of polyester, polyether, polyurethane, polyepoxy (meth)acrylates and (meth)acrylate esters obtained by esterification of (meth)acrylic acid with alcohols selected from the group consisting of tetrols and hexyls are present.

12. Coating system according to claim 3, wherein step IV) is carried out in acetonic solution before or after the addition of component (E).

13. Coating system according to claim 3, wherein the aqueous polyurethane dispersion obtained according to step III) comprises at least a further initiator and optionally further auxiliaries and additives which allow curing with high-energy radiation.

14. Coating system according to claim 3, wherein the aqueous polyurethane dispersion obtained according to step III) contains less than 5% by weight of organic solvents.

15. Hard transparent or pigmented coating materials comprising a coating system according to claim 3.

16. Adhesive comprising a coating system according to claim 3.

17. Substrate comprising a hard transparent or pigmented coating material according to claim 15.

18. Substrate according to claim 17, wherein the substrate is selected from the group consisting of wood, wood-based materials, furniture, wood-block flooring, doors, window frames, metallic articles, plastics, paper, cardboard, cork and leather.

19. Article comprising the adhesive according to claim 16.

20. Substrate according to claim 19, wherein the article is selected from at least two alike and/or different materials selected from the group consisting of wood, wood-based materials, furniture, wood-block flooring, doors, window frames, metallic articles, plastics, paper, cardboard, cork and leather.

* * * * *